United States Patent [19]

Coats et al.

[11] Patent Number: 5,129,775
[45] Date of Patent: Jul. 14, 1992

[54] BALE HANDLING APPARATUS

[76] Inventors: Byron N. Coats, 404 Jefferies Dr., Tuttle, Okla. 73089; Randal T. Long, P.O. Box 7386, Moore, Okla. 73154

[21] Appl. No.: 708,313

[22] Filed: May 31, 1991

[51] Int. Cl.$^5$ .............................. A01D 85/00
[52] U.S. Cl. .......................... 414/24.5; 294/120; 414/703; 414/920
[58] Field of Search .......... 414/24.5, 24.6, 700, 414/701, 703, 917, 920; 294/61, 120; 172/272-275

[56] References Cited

U.S. PATENT DOCUMENTS

| | | | |
|---|---|---|---|
| 3,811,587 | 5/1974 | Seaberg | 414/700 |
| 4,065,009 | 12/1977 | Old | 414/686 |
| 4,120,405 | 10/1978 | Jones et al. | 414/721 X |
| 4,364,700 | 12/1982 | Arabshian et al. | 414/24.5 |
| 4,674,786 | 6/1987 | Lynch | 414/24.5 X |
| 4,854,809 | 8/1989 | Rhodes | 414/703 X |

FOREIGN PATENT DOCUMENTS 1264024  5/1961  France ..................... 414/703

*Primary Examiner*—Robert J. Spar
*Assistant Examiner*—Donald W. Underwood
*Attorney, Agent, or Firm*—Robert K. Rhea

[57] ABSTRACT

An apparatus for lifting and carrying large cylindrical hay bales is formed by a base frame and a lift frame longitudinally interconnected for vertical pivoting movement of the lift frame. One end of the base frame is connected to the three point hitch of a tractor. Hydraulic cylinders pivot the lift frame and a tine-equipped bale supporting frame upwardly. Parallel linkage forming a part of the lift frame maintains the tines of the bale lift frame in upwardly inclined relation to prevent unauthorized movement of a lifted hay bale off the tines. A tilt cylinder on the lift frame permits the bale frame tines to be inclined in a downward direction for depositing the bale at a selected or elevated position with respect to the surface of the earth.

1 Claim, 2 Drawing Sheets

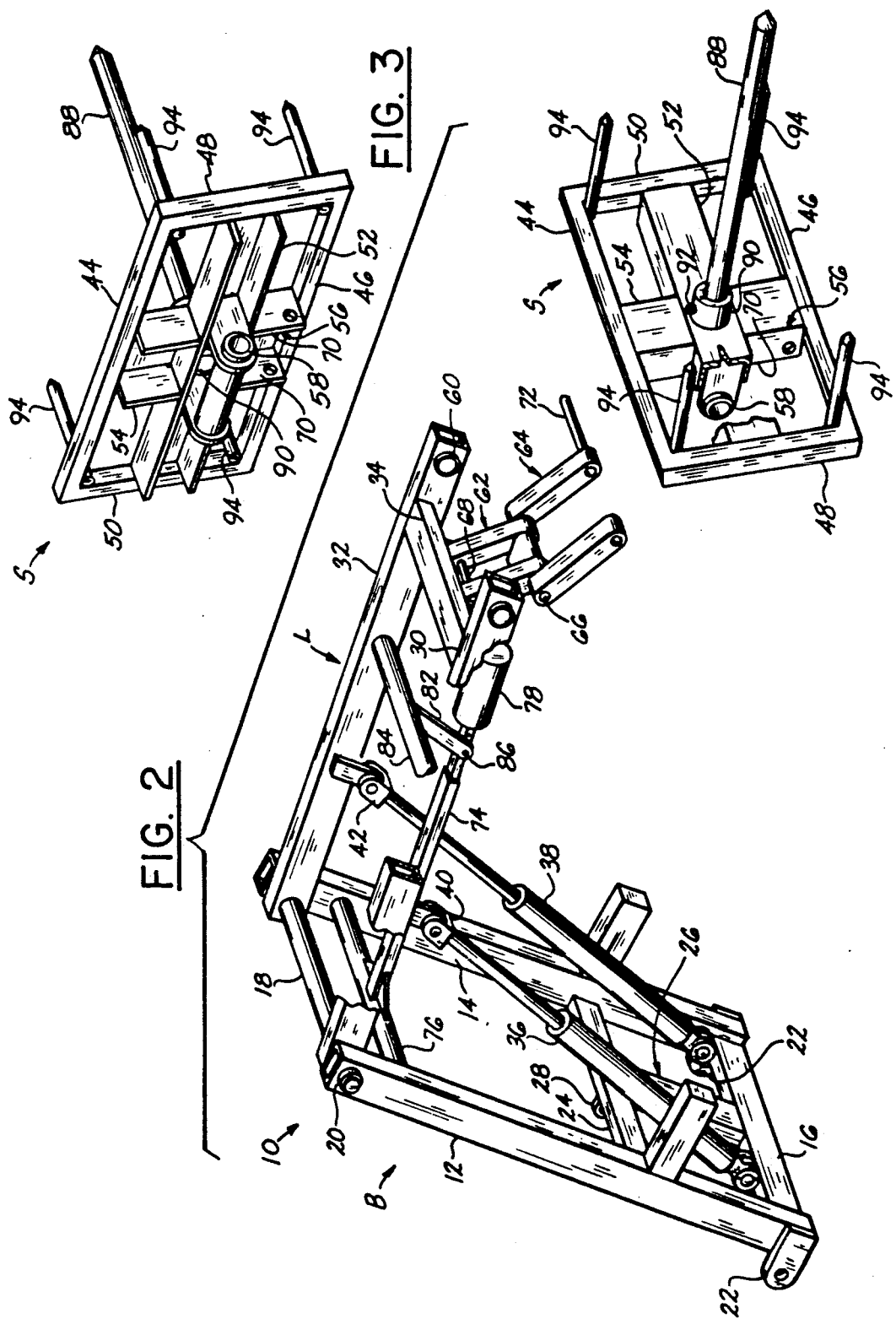

BALE HANDLING APPARATUS

BACKGROUND OF THE INVENTION

1. Field of the Invention

This invention relates to farming equipment and more particularly to apparatus for handling baled crop material of jumbo size and mass.

It has become common practice to bale crop material, such as hay, into relatively large, compact bales which is a commercially lucrative and labor saving practice, particularly for small farms or large scale commercial hay operations.

These large bales have proven to be particularly satisfactory in the ability to provide a self-shedding protective covering from inclement weather along the outer portion of their perimeters. Such self-formed protective covering permits the bales to be stored in the field and moved to a place of feeding as necessary.

These bales of material are generally of relatively large mass, ranging from one thousand to two thousand pounds. On account of the bale size and mass, some mechanical power means must be provided in order to move the bales either from the place of discharge from the baling machine to a place of field storage in side-by-side or stacked relation or as some farmers prefer, to a place having a protective or partially protective cover from the weather and which excludes the bales from contact by field grazing livestock.

This invention provides such an apparatus.

2. Description of the Prior Art

The prior art reveals a number of patents which are capable of handling jumbo size bales. The devices of such prior patents are generally limited to apparatus lifting jumbo-size hay bales a distance approximately twice the transverse dimension of the bales, whereas some operators desire to stack the bales at higher elevations above the surface of the earth.

U.S. Pat. No. 4,364,700 is an example of prior patents in which a support bar connected at one end with a tractor three point hitch has its other end pivotally connected with a two-tine frame for engaging a hay bale with the frame being tilted about the axis of the support bar by a hydraulic ram to maintain the plane of the bale lifting tines at or near the horizontal during the lifting action of the support bar by the three point tractor hitch.

This invention is distinctive over this and other similar patents by providing pivoting lift frames with one end portion of one frame connected with the three point hitch of a heavy-duty tractor with the other lift frame having parallelogram linkage pivotally connected at one end with a bale frame having bale engaging tines projecting in a direction opposite the tractor which maintains the plane of the tines at least horizontal or inclined upward opposite the tractor with respect to the surface of the earth.

SUMMARY OF THE INVENTION

The bale handling apparatus is formed by hingedly interconnected elongated frame members, each defined by parallel spaced apart side members.

The normally upright base frame is connected by one end portion with the three point hitch of a tractor or the like.

One end portion of the other or lift frame is hingedly connected with the upright end portion of the base frame and vertically raised and lowered by hydraulic cylinders mounted on the base frame.

The other end portion of the lift frame is pivotally connected with a tine-equipped bale frame. Elongated interconnected linkage is connected at one end with the upper end portion of the base frame and at its other end pivotally connected with the bale frame in parallelogram fashion with the lift frame side rails.

A fluid pressure operated tine tilt cylinder is interposed in the linkage for tilting the bale frame relative to the plane of the lift frame and the surface of the earth when desired.

The principal objects of this invention are: to provide a tractor mounted and operated bale handling apparatus capable of retrieving, transporting and discharging large size crop material bales which utilizes gravitational attraction for the bale mass to maintain it on a bale frame tines when elevated above the surface of the earth; to provide a bale frame which immediately releases the bale from the bale frame when desired; and, to provide a bale handling apparatus for stacking and unstacking large crop material bales in which the mass of the bales is utilized for increasing the traction of the tractor propulsion wheels.

BRIEF DESCRIPTION OF THE DRAWINGS

FIG. 2 is a side elevational view of the apparatus, illustrating by broken lines the range of movement of the pivoting frame from a downward bale engaging position to an elevated bale stacking position; and, FIG. 3 is a rear end isometric view of the bale frame, per se.

DESCRIPTION OF THE PREFERRED EMBODIMENT

Figure 1:
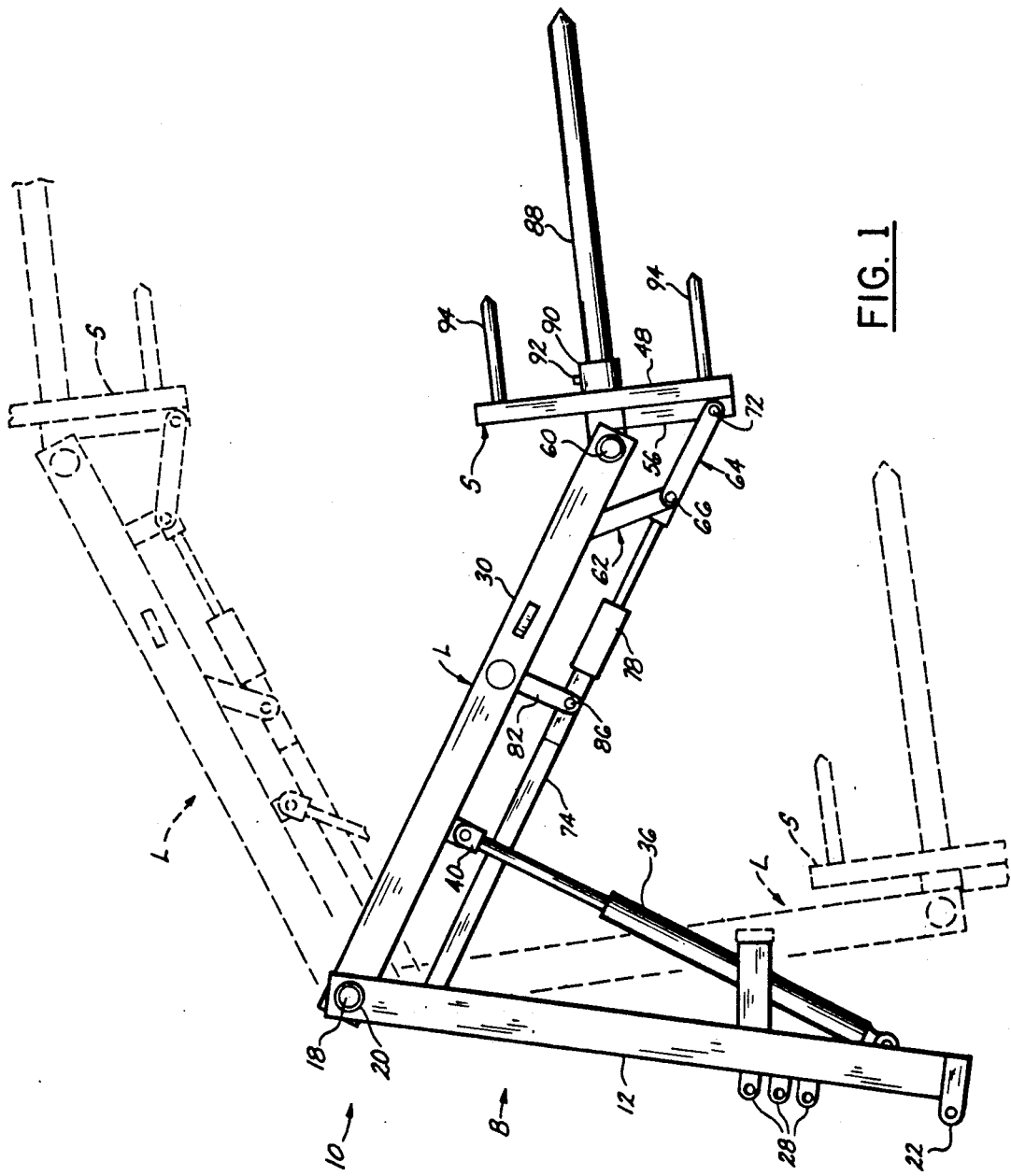
FIG. 1 is a partially exploded isometric view of the bale lifting apparatus with parts broken away for clarity.

Like characters of reference designate like parts in those figures of the drawings in which they occur.

In the drawings:

The bale lifting apparatus 10 is formed by pivotally interconnected elongated frames comprising a base frame B, a lift frame L and a bale support frame S.

The base frame B is formed by a pair of parallel normally upright side members 12 and 14, interconnected at their depending end portions by a transverse brace 16 and at their upper end portions by a transverse shaft 18 journaled at its respective ends within the upper end portion of the respective side members 12 and 14 by bushings 20, only one being shown.

A pair of transversely apertured ears 22 respectively connected with the depending end portion of the base side members 12 and 14 connect the base frame depending end portion to the two lowermost points of a three point hitch of a conventional tractor, neither of which are shown.

A T-shaped brace formed by a cross member 24, extending between the base frame side members 12 and 14 in vertically spaced relation above the base frame bottom brace 16 and an upright stem portion 26 interposed between the brace 16 and the transverse brace 24, supports a plurality of vertically spaced transversely apertured lugs 28 (FIG. 1), selectively connected with the uppermost hitch of the tractor's three point hitch.

The lift frame L is similarly formed by parallel spaced apart side members 30 and 32 pivotally journaled at one end portion, by the base frame shaft 18 for vertically pivoting movement of their other end portions. The end portions of the side members 30 and 32 opposite the shaft 18 are spanned by a transverse brace 34.

A pair of hydraulic cylinders 36 and 38 have their base end portions pivotally connected in spaced apart relation with the base frame cross brace 16 and their piston rod end portions 40 and 42 respectively pivotally connected with the side members 30 and 32 of the lift frame L for vertical pivoting movement of the lift frame L about the horizontal axis of the base frame hinge shaft 18.

The bale support frame S is generally rectangular elongated in overall configuration, defined by a perimeter frame formed by normally horizontal upper and lower tubular frame members 44 and 46 interconnected at their respective ends in parallel spaced relation by normally upright tubular end members 48 and 50.

A heavy-duty channel brace 52 extends horizontally between the support frame end members 48 and 50, medially their ends. Similarly upper and lower vertically disposed channel braces 54 and 56 extend in vertical alignment between the horizontal channel 52 and respective upper and lower support frame top and bottom frame members 44 and 46 to form a rigid mounting for connecting the bale frame S with the end of the lift frame L opposite the base frame shaft 18.

To accomplish this, a horizontal tubular shaft 58 (FIGS. 2 and 3) is rigidly mounted horizontally to the horizontal channel 52 rearward surface for receiving, at its respective end portions, the bushings 60 for journaling the ends of the lift frame side members 30 and 32 opposite the base frame shaft 18.

Upper and lower pairs of links 62 and 64 are cooperatively connected pivotally at one end of each link of said pairs of links by a horizontal pivot pin 66. The other end portion of the pair of links 62 are each connected for vertical pivoting movement to the lift frame brace 34 by an upper pivot pin 68.

The other or depending end portion of each link of the pair of links 64 is pivotally connected with the depending end of the transversely apertured rearwardly projecting legs 70 of the frame S vertical brace 56 by a lower pivot pin 72.

An elongated frame S tilt link 74 is connected at one end portion with a link shaft 76 extending between and journaled by the base frame side members 12 and 14 in downward parallel spaced relation with respect to the base frame hinge shaft 18. The forward end portion of the tilt link 74 is connected with the base end of a frame S tilt pressure cylinder 78 having its piston rod 80 connected with the pivot pin 66 between the pairs of links 62 and 64 so that extending or retracting the lift cylinder piston rod 80 pivots the support frame S about its horizontal axis formed by the shaft 58 for the purposes presently explained.

A tilt cylinder support link 82 is interposed between a transverse support shaft 84 extending between the lift frame side members 30 and 32 intermediate their ends and is pivotally connected by a pin 86 with the end portion of the lift link 74 adjacent the tilt cylinder 78.

One end portion of a heavy duty bale lifting tine 88 is slidably received by a sleeve 90 normal to the plane of the frame S and projecting into the horizontal cross channel 52. A pin 92 anchors the tine 88 within the sleeve 90. Similarly, a plurality of bale antirotating tines 94 are rigidly connected at one end portion within the respective corner of the support frame S and project from the bale engaging surface of the support frame S in parallel relation with respect to the bale support tine 88.

Operation

In operation, assuming the apparatus 10 has been connected with the three point hitch of a tractor as described hereinabove with the hydraulic cylinders 36, 38 and 78 connected with the hydraulic lines and controls of the tractor. The operator positions the device 10, when in the position of the solid and downward dotted line position of FIG. 1 with the tines in parallel alignment with the axis of a bale, not shown, to be lifted.

Rearward movement of the tractor forces the tines into one end of the bale. The lift frame L is pivoted by the hydraulic cylinders 36 and 38 to position the bale frame S and the bale above the surface of the earth while transporting it to a place of bale deposit. If the bale is to be elevated to a higher position, either on other bales or in a hay loft or the like, not shown, the lift cylinders further raise the lift frame L so the bale frame is at the selected elevation. During such upward movement of the lift frame L, the parallelogram linkage arrangement, formed by the frame side members 30 and 32 in combination with the linkage 74 and 66 and lift cylinder 78 acts to tilt the axis of the bale lift tine 88 so that its bale entering end is disposed upwardly with respect to its other or bale frame connected end to maintain the bale on the tine during the carrying and lifting action.

The tilt cylinder 78 is operated by the operator actuating the hydraulic controls, when the bale is in position to be released to tilt the tines 88 and 94 in a downward inclined direction at their free ends so that the tines and bale frame S may be removed from contact with the bale.

Obviously the invention is susceptible to changes or alterations without defeating its practicability. Therefore, we do not wish to be confined to the preferred embodiment shown in the drawings and described herein.

We claim:

1. A jumbo size hay bale lifting and transporting apparatus adapted for connection with the three point hitch of a tractor, comprising:

elongated base frame means including parallel normally upright spaced-apart first side members having a first transverse brace between their depending end portions and having a transverse shaft extending between their upper end portions;

a T-shaped brace extending between the depending end portion of said first members and having a central depending stem portion connected with said first transverse brace;

elongated lift frame means including parallel spaced-apart second side members journalled at their one end portions by said shaft between said first members for vertical pivoting movement of their other end portions about a horizontal axis and having a second transverse brace extending between said other end portions;

a bale support frame means including a rectangular frame having end and longitudinal side members interconnected by upright and horizontal channel members disposed in crossed relation;

a tubular shaft extending between and journalled at its respective end portions by the other end portions of said second side members opposite said shaft, said tubular shaft being secured intermediate its ends to the horizontal channel member for vertical pivoting movement of said bale frame about the axis of said tubular shaft;

first and second pairs of spaced-apart links pivotally joined together in longitudinal relation, the end portion of said first pair of links opposite their pivotal connection, pivotally depending from said second transverse brace, the end portion of said second pair of links, opposite their pivotal connection, pivotally connected with the vertical channel;

normally horizontal tine means connected at one end portion with said bale support frame means opposite said lift frame means for penetrating a hay bale;

a tilt frame link connect at one end portion with said base frame shaft;

pressure cylinder means extending between and connected with the other end portion of said tilt link and the end portion of said second pair of links opposite said bale frame for vertical pivoting movement of said bale support frame means relative to said lift frame means; and, other pressure cylinder means interposed between said base frame means and said lift frame means for vertical pivoting movement of said lift frame means relative to said base frame means.

* * * * *